United States Patent [19]

Ryan et al.

[11] E Re. 29,334

[45] Reissued Aug. 2, 1977

[54] PHOSPHOR COMBINATION AND METHOD, PARTICULARLY ADAPTED FOR USE WITH EXPLOSIVES, FOR PROVIDING A DISTINCTIVE INFORMATION LABEL

[75] Inventors: Frederick M. Ryan, New Alexandria; Robert C. Miller, Pittsburgh, both of Pa.

[73] Assignee: Westinghouse Electric Corporation, Pittsburgh, Pa.

[21] Appl. No.: 611,576

[22] Filed: Sept. 8, 1975

Related U.S. Patent Documents

Reissue of:

[64] Patent No.: 3,772,099
Issued: Nov. 13, 1973
Appl. No.: 143,772
Filed: May 17, 1971

[51] Int. Cl.[2] ..... C06B 45/06; C06B 45/02; C06B 39/00; C03C 3/28

[52] U.S. Cl. ..... 149/18; 149/21; 149/29; 427/157

[58] Field of Search ..... 149/17, 18, 21, 29, 149/114; 427/157

[56] References Cited

U.S. PATENT DOCUMENTS

| | | | |
|---|---|---|---|
| 2,707,687 | 5/1955 | Lockwood et al. | 117/335 |
| 3,096,197 | 7/1963 | Buetow et al. | 117/33.5 |
| 3,199,454 | 8/1965 | Hart | 102/39 |
| 3,231,738 | 1/1966 | Fischer | 250/71 |
| 3,416,993 | 12/1968 | Heusser et al. | 252/408 |
| 3,473,027 | 10/1969 | Freeman | 250/71 |
| 3,474,730 | 10/1969 | Sheeran | 102/27 |
| 3,502,588 | 3/1970 | Winberg | 252/408 |
| 3,619,265 | 11/1971 | Hammond | 117/33.5 |
| 3,772,200 | 11/1973 | Livesay | 252/301.1 R |
| 3,897,284 | 7/1975 | Livesay | 149/21 |

FOREIGN PATENT DOCUMENTS

| | | |
|---|---|---|
| 39-3,396 | 2/1964 | Japan |
| 686,642 | 1/1953 | United Kingdom |
| 1,119,318 | 7/1968 | United Kingdom |
| 1,143,362 | 2/1969 | United Kingdom |
| 1,186,251 | 4/1970 | United Kingdom |

*Primary Examiner*—Samuel W. Engle
*Assistant Examiner*—Donald P. Walsh
*Attorney, Agent, or Firm*—W. D. Palmer

[57] ABSTRACT

Phosphor-explosive material combination and method wherein a small amount of inorganic phosphor is mixed with explosive material to provide an indicia or label of information regarding the explosive, either before or after detonation of same. The phosphor can readily be located with an ultraviolet lamp even after the explosive has been detonated, and by correlating the phosphor emission spectra with data known about the explosive when it is manufactured, the explosive can be identified. Line-emitting phosphors are especially useful because of their distinctive emission characteristics, which provide a vast number of possible combinations of emission which are correlated against the data known about the explosive when it is manufactured. Preferably the phosphor is formed as a combination of finely divided "spotter" phosphor and finely divided "coding" material held together by a binder in the form of small conglomerates, in order to facilitate initial location and later identification of same. There exists a vast number of different combinations of distinctive fluorescent emission, and these can be combined to label any item for later identification.

21 Claims, 19 Drawing Figures

INVENTORS
Frederich M. Ryan
Richard C. Miller

W. P. Palmer
ATTORNEY

PHOSPHOR COMBINATION AND METHOD, PARTICULARLY ADAPTED FOR USE WITH EXPLOSIVES, FOR PROVIDING A DISTINCTIVE INFORMATION LABEL

Matter enclosed in heavy brackets [ ] appears in the original patent but forms no part of this reissue specification; matter printed in italics indicates the additions made by reissue.

BACKGROUND OF THE INVENTION

This invention generally relates to labeling of an item with an individualistic and readily identifiable indicia in order to provide an item identification at a location remote from that location at which the label was applied and, more particularly, to a combination explosive and method whereby explosive material is coded with information to permit an identification of the explosive material either before or after detonation of same.

The use of commercial explosives is very extensive and a comprehensive summary and discussion of same is set forth in the Blasters' Handbook, 15th, Edition (1969) by E. I. DuPont, Wilmington, Delaware. Accidental explosions have always constituted a problem with respect to a proper identification of the explosive involved. In recent years, the relatively large number of terrorists bombings have presented substantial problems, among which is the proper identification of the explosive used, and the determination of where same might have been purchased, etc. Public Law 91–452, Oct. 15, 1970, at 84 Stat. 954 requires certain records to be kept for the sale of explosive materials, but once such materials are detonated, it is a most difficult if not impossible task to trace the distribution of the explosive material prior to its detonation.

It is also desirable to label items of manufacture or items which are subjected to handling with an individualistic and readily identifiable indicia in order to provide an item identification at a location remote from that location at which the label was applied. One of the problems with such labeling is that it is extremely difficult to provide a vast number of different labels which can be scanned by some type of automatic equipment in order to facilitate automatic handling.

It is known in the prior art to apply a fluorescent material to an item and later trace a possible theft or misappropriation of such items by exposing the hands or garments of a possible suspect to ultraviolet radiation, in order to detect the presence of the fluorescent material. Such an indicia, however, normally has merely indicated the presence or lack of such fluorescent material.

in U.S. Pat. No. 3,231,738 dated Jan. 25, 1966, it is suggested to place an organic fluorescent material such as anthracene or fluorescein or rhodamine in a very finely divided state near an explosive charge or the like so that organic particles will be blown into the air with the explosion. The airborne path of the particles is then traced by placing solidified solvent in an open container in the expected path of the particles, and when the particles fall to earth and strike the solidified solvent, they can be detected by their fluorescence. All of these organic fluorescent materials act as fuels, however, and when placed in receptive proximity to the reactive atmospheres and blast effect resulting from an explosion, these fuels will completely oxidize or otherwise disintegrate, thereby completely destroying them.

U.S. Pat. No. 3,199,454 dated Aug. 10, 1965 discloses placing an organic fluorescent material such as sodium fluorescein about a small explosive charge which is to be detonated in water, in order to help control predatory fish. The explosive charge is relatively small and the presence of the water in which the charge is detonated serves to protect the fluorescein from the blast effects of the detonation so that upon striking the water, the fluorescein immediately provides an indicative fluorescent response.

It is also generally known to provide tracing or indicative materials along with such substances as drugs, and such a technique is disclosed in U.S. Pat. No. 3,341,417 dated Sept. 12, 1967. As described in this patent, an insoluble radio-opaque substance which is visible under X-rays is included with such drugs as barbiturates, in order that it may [readly] *readily* be determined that barbiturates have been ingested.

It is also known to apply organic fluorescent dyes as tracer materials to commercial items and this is described in U.S. Pat. No. 2,920,202 dated Jan. 5, 1960. It should be noted, however, that organic fluorescent materials exhibit an extremely broadband type of fluorescent emission and such dyes are normally used to describe one to two possibilities, namely, the presence or lack of such dye. A somewhat similar use of organic fluorescent dyes is described in U.S. Pat. No. 2,392,620, dated Jan. 8, 1946 wherein fluorescent dyes are placed in hydrocarbon products in order to show the presence or lack of undesirable crude oil in a desired crude oil.

Other uses for fluorescent dyes such as rhodamine are to embed such materials in plastic containers for the purpose of detecting possible contamination which may result from abrasion between the packaged component and the packaging film and such a technique is described in U.S. Pat. No. 3,422,265 dated Jan. 14, 1969.

SUMMARY OF THE INVENTION

In accordance with the present invention, there is provided explosive agent or explosive material which preferably has a form suitable for use. Incorporated with the explosive material is a relatively small amount of inorganic phosphor means which is positioned in receptive proximity to the shock, pressures, high-temperatures and reactive atmospheres which result from the detonation of the explosive. The phosphor survives the explosive blast and can readily be detected by ultraviolet light, for example, and the fluorescence of the phosphor comprises a readily identifiable indicia of information regarding the explosive. In its preferred form, the phosphor is in a finely divided state and along with other finely divided material is retained in intimate association in the form of small conglomerates. The other finely divided material, once it has been located, is readily identifiable by its line-emission fluorescent response or by other suitable techniques. The foregoing requires that the particular individualistic fluorescent emission be correlated with data known about the explosive at the time it is manufactured, such as manufacturer, date of manufacture, type of explosive, etc., and such data is all readily available. The foregoing technique of utilizing the line-emissions of fluorescent materials can be used to label any item with an individualistic and readily identifiable indicia in order to provide an item identification at a location which is remote from that location at which the label was applied. No specific orientation of such a label is required. When utilizing line-emitting phosphors, there are provided a vast number of combinations of different emissions which can be readily correlated with the data known about the item at the time the phosphor label is applied to the item, so that the item can be traced at a later date.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENTS

The details for handling and making commercial explosives, including dynamite, are well known and for further information, reference is made to the foregoing Blaster's Handbook and to other known literature, such as U.S. Pat. No. 2,211,737 dated Aug. 13, 1940 and U.S. Pat. No. 2,344,149 dated Nov. 9, 1943. In accordance with the present invention, during the manufacture of explosive cartridges, such as a dynamite cartridges, there is incorporated in intimate association with the explosive material and in immediate and receptive proximity to the shock, pressure, high-temperature and reactive atmospheres resulting from the detonation thereof, a small amount of finely divided, particulate, inorganic phosphor means which comprises a readily identifiable indicia, as will be explained in detail hereinafter. This fluorescence indicia is correlated against then-known predetermined data regarding the explosive material, for example the manufacturer' indicia, the type of explosive, the year of manufacture, the month of manufacture, the week of manufacture, and if desired, even the day of manufacture in the case of high volume explosives.

Since the distribution channels for the explosive can be recorded, the indicia which is provided by the phosphor can be correlated against the distribution of the explosive.

Figure 1:
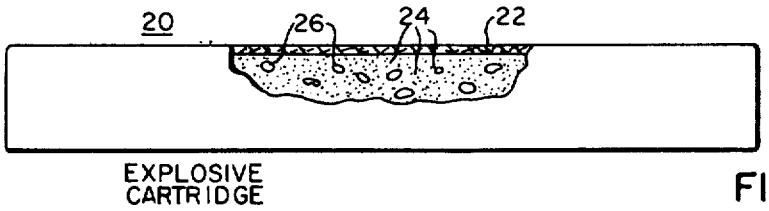
FIG. 1 is an elevational view, partly broken away, of an explosive cartridge such as a stick of dynamite, showing phosphor conglomerates of the present invention scattered throughout the dynamite.

In FIG. 1 is shown a generally conventional dynamite cartridge 20 which comprises a fibrous casing 22 enclosing the dynamite 24 having scattered throughout small phosphor conglomerates 26, in accordance with the present invention. The usual florescent phosphor materials, such as are used in fluorescent lamps, are quite finely divided and a representative average particle diameter is in the order of 6–8 microns. If such very finely divided material, such as halophosphate phosphor, were to be scattered throughout the dynamite, the finely divided particles would survive the detonation and would be detectable at night as viewed under 254 nm ultraviolet radiations. They would be quite difficult to pick up, however, because of their extremely small size, and only one indicia of information would be available from any one fluorescent phosphor material. While this would be useful, it is highly desirable to provide a large amount of readily available information for any particular explosive.

In accordance with the preferred form of the present invention, fluorescent materials which have very distinctive emissions are utilized in combination to provide a vast number of different fluorescent emissions which can be readily detected. The most distinctive fluorescent emitting materials are those of the lanthanide series of rare-earth metals which, apparently because of the incompletely filled 4F-shells, possess a large number of sharp levels. The transitions between these provide a many-line spectrum, in contrast to the usual type of fluorescent materials which usually provide a continuous or so-called band-type emission.

Figure 2:
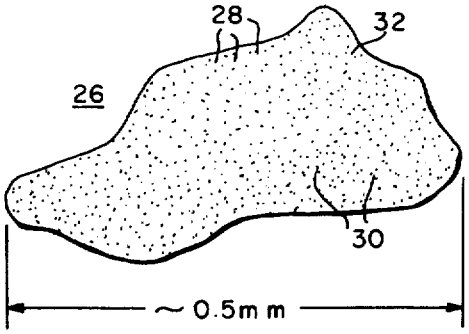
FIG. 2 is a greatly enlarged view of one of the phosphor conglomerates of the present invention.
Figure 3:
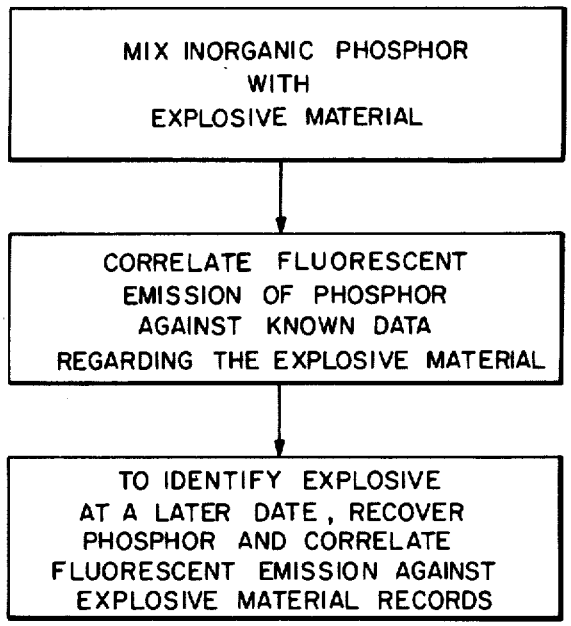
FIG. 3 is a flow chart illustrating the basic method steps which are utilized in coding explosives for later identification.

In accordance with the preferred form of the present invention, typical commercial phosphors such as are used in fluorescent lamps, for example, are used as what can be termed "spotting" phosphors and there are mixed therewith a predetermined combination of different line-emitting "coding" phosphors which provide a very individualistic emission when excited by predetermined energy such as ultra-violet radiation. The band-emitting phosphors and line-emitting phosphors are mixed together in the form of small conglomerates 26, such as shown in FIG. 2, and these small conglomerates are dispersed throughout the explosive, such as the dynamite cartridge. When the explosive material is detonated, there is usually some shattering of the conglomerates, but because of the very large number of phosphor particles which are contained in each conglomerate, the recovered conglomerates, even though shattered, will contain a representative sampling of all different phosphor particles used for identification. The individual phosphor coding which is contained within each conglomerate is therefore readily identifiable, as will be explained hereinafter.

As a specific example for forming the conglomerate 26 such as shown in FIG. 2, 90 percent by weight of a very finely divided commercial "spotting" phosphor 28, such as apatite structured cool-white halophosphate activated by antimony and manganese, is mixed with 10 percent by weight of very finely divided "coding" phosphor 30, an example of which is yttrium oxide activated by trivalent europium. The foregoing finely divided phoshphor mixture is mixed with an aqueous solution of potassium silicate (75 percent by weight $H_2O$) to form a very thick paste and this paste is spread in a layer approximately two mm thick and permitted to air dry for twelve hours. After air drying, the material is baked at a temperature of approximately 80° C for a period of three hours and then is allowed to cure for about 24 hours. The cured mass comprises about 80 percent by weight phoshphor and 20 percent by weight potasium silicate. Thereafter, the resulting hard mass is reduced to a particulate status, such as by grinding or hammer milling. The resulting milled product is then passed over a sieve No. 20 and then over a sieve number 40 to separate the fines and coarses. The resulting conglomerates have a particle size in the order of 0.5 to 0.7 mm. Because of the extremely fine state of division of the phosphor particles, each of the conglomerates 26 as shown in FIG. 2 will normally contain well in excess of one million individual phosphor particles bound by the binder 32 so that an extremely large number of different finely divided phosphor materials can be mechanically mixed together and each resulting conglomerate will contain a substantial number of particles of each of the different phosphors which are utilized. The resulting conglomerates 26 are then thoroughly mixed into the explosive, such as dynamite, during its processing into a form suitable for use. In the case of cast explosives, the conglomerates can be dispersed throughout the molten explosive and cast with same. The amount of phosphor material which is incorporated into the dynamite is in no way critical and amounts of from 0.01 percent by weight to 1 percent by weight can be utilized. Smaller or larger amounts of phosphor also can be utilized. In the case of a conglomerate 26 such as shown in FIG. 2, the weight of the conglomerate will be approximately one milligram. If 0.1 percent by weight of conglomerates are used with a 200 gram stick of dynamite, there will be approximately 200 of the conglomerates 26 scattered throughout the dynamite stick. Of course, in identifying the information which is contained within each conglomerate, it is necessary to find only one of the conglomerates or a large residual fragment thereof, such as by using an ultraviolet light under conditions or darkness, pick up the conglomerate with a tweezer, and analyze the fluorescent response with a conventional mono-chromator, as will be explained hereinafter.

The emission spectra of the lanthanide series of rare-earth metals have been studied in detail and are set forth in comprehensive form in Applied Physics, Vol. 2, No. 7, July 1963 at page 608. In the following Table I are set forth the lanthanide rare-earth metals which can be utilized as activators in order to provide very distinctive line emissions of radiations, along with some other activator ions which provide line-appearing type emissions. These activators can be used with many different host or matrix materials to form a phosphor and, as an example, yttrium oxide has been found to be a very suitable host material for many of these metals to provide many different phosphors which can be used for coding purposes. These phosphors are all well known and the general properties of rare-earth metal activated materials are described in the Journal of the Electrochemical Society, Volume 111, No. 3, Mar. 1964, at pages 311-317.

TABLE I

| | |
|---|---|
| $Pr^{+3}$ | $Dy^{+3}$ |
| $Nd^{+3}$ | $Ho^{+3}$ |
| $Sm^{+3}$ | $Er^{+3}$ |
| $Sm^{+2}$ | $Tm^{+3}$ |
| $Eu^{+3}$ | $Yb^{+3}$ |
| $Cr^{+3}$ | $V^{+3}$ |
| $Gd^{+3}$ | $Mn^{+4}$ |
| $Tb^{+3}$ | $UO_2^{+2}$ |
| $Fe^{+3}$ | |

The $Cr^{+3}$ ions are readily assimilated into an $Al_2O_3$ host material. A suitable host for $Mn^{+4}$ is magnesium fluorogermanate, and $UO_2^{+2}$ is readily assimilated into a lithium fluoride host. $V^{+2}$ is readily assimilated into a magnesium oxide host, and $Fe^{+3}$ into $LiAl_5O_8$. $Sm^{+2}$ is readily assimilated into $CaF_2$. The trivalent lanthanide rare-earth metals normally can be used with one or more of an yttrium oxide host, an ytrrium orthovanadate host, a lanthanum phosphate host, or a gadolinium vanadate host.

Figure 5:
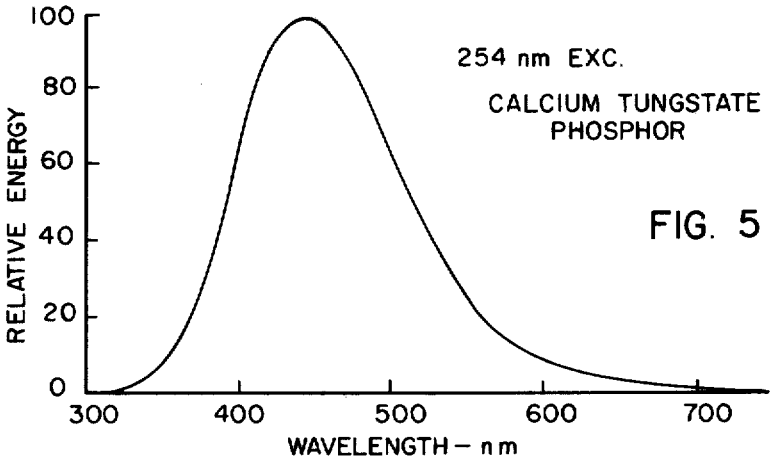
FIG. 5 is a graph similar to FIG. 4, but showing the spectral energy distribution for a calcium tungstate phosphor, which can be used as a spotting phosphor.

The actual width of a fluorescent line as emitted by a rare-earth metal activated phosphor is generally in the order of three to ten Angstroms as measured at an intensity which is 50 percent of the maximum fluorecent intensity of the emission. This narrow line of emission should be contrasted to the emission of calcium tungstate as shown in FIG. 5, wherein the width of the band, as measured at an emission intensity which is 50 percent of the maximum intensity, is 1250 Angstroms. For the purposes of this invention, a line-emitting phosphor is described as one for which the emission, as viewed through a spectroscope, appears as one or more lines, in contrast to a "band" which occupies a band in the visible spectrum, as viewed with a spectroscope. Of course, the phosphor emission is not restricted to the visible and may occur in the ultraviolet or infrafed.

To enable the conglomerates 26 to be readily located after an explosive material is detonated, it is desirable to incorporate with each conglomerate a substantial proportion of fluorescent material which serves primarily as a spotter or locator. Most of the commercial phosphors which are used in fluorecent lamps can be used for such purpose and these phosphors normally have a continuous or band-type emission. Of course, the so-called spotter phosphor could also be used to provide information and, for example, a different spotter phosphor can be used to identify each different manufacturer of explosives.

Figure 4:
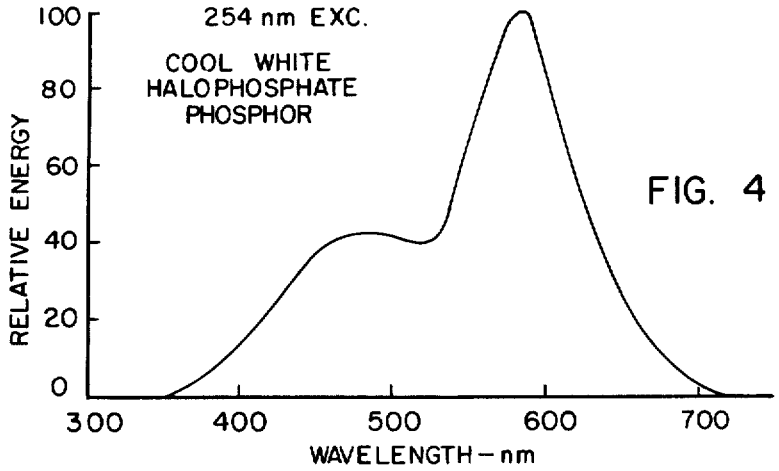
FIG. 4 is a graph of energy versus wavelength showing the spectral distribution for a cool white halophosphate phosphor, which can be used as a spotting phosphor.
Figure 6:
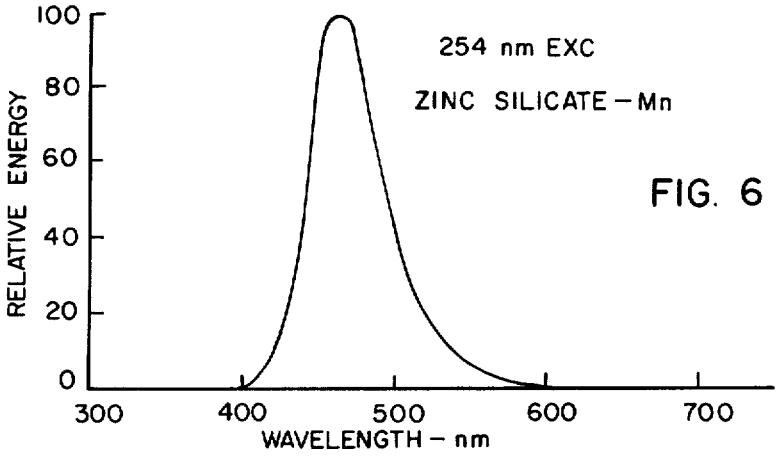
FIG. 6 is a graph similar to FIG. 4, but showing the spectral energy distribution for a zinc silicate phosphor, which can be used as a spotting phosphor.
Figure 7:
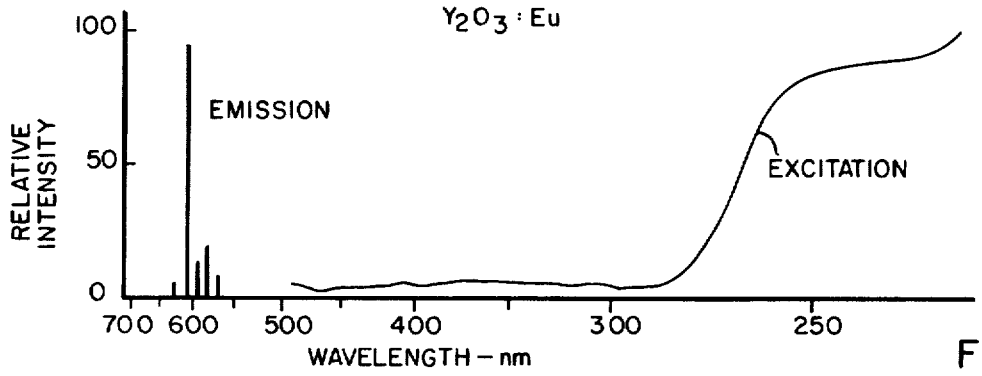
FIG. 7 is a graph or relative energy versus wavelength showing the excitation and emission spectra for trivalent europium-activated yttrium oxide, which can be used as a coding phosphor.
Figure 8:
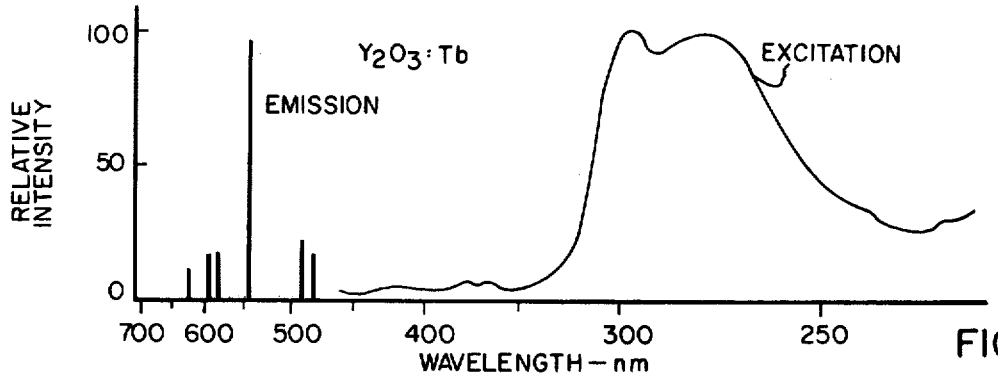
FIG. 8 is a view similar to FIG. 7, but shown for trivelent terbium-activated yttrium oxide.
Figure 9:
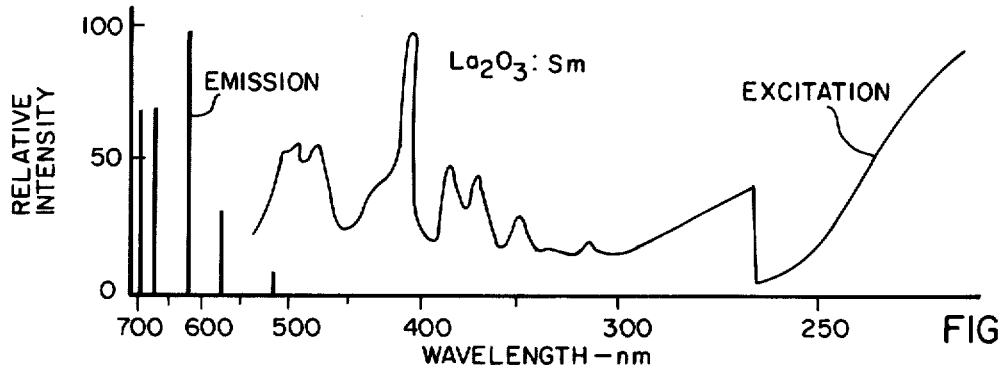
FIG. 9 is a graph similar to FIG. 7, but taken for a lanthanum oxide host which is activated by trivalent samarium.
Figure 10:
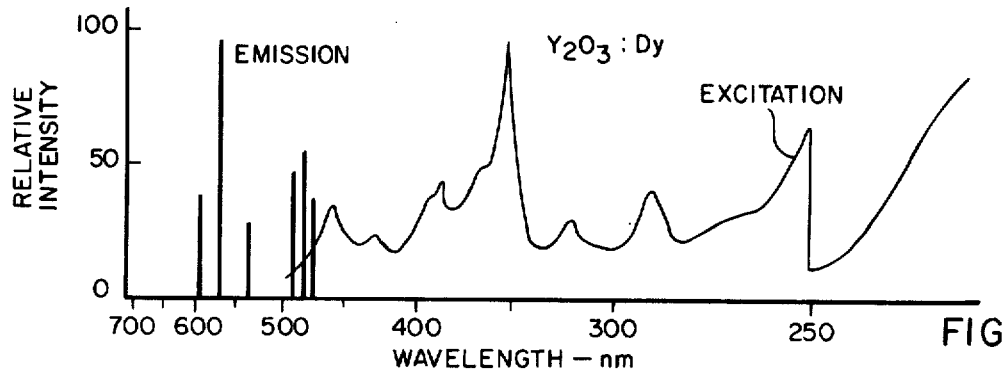
FIG. 10 is a graph similar to FIG. 7, but taken for a trivalent dysprosium-activated phosphor.
Figure 11:
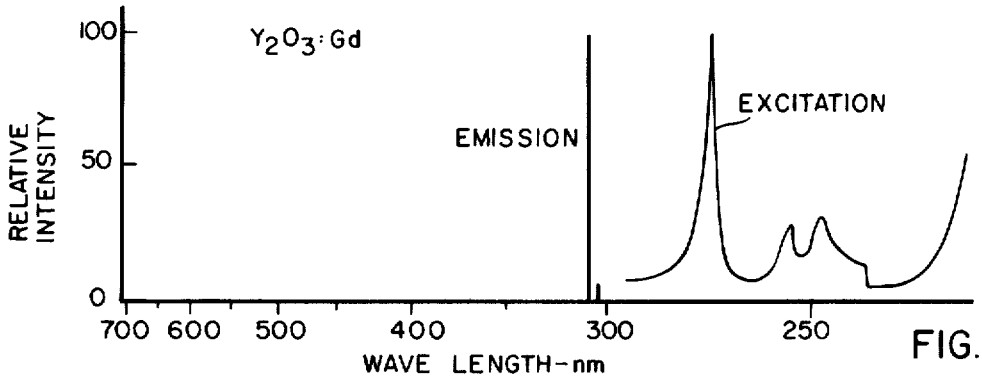
FIG. 11 is a graph similar to FIG. 7, but taken for a trivalent gadolinium-activated phosphor.
Figure 12:
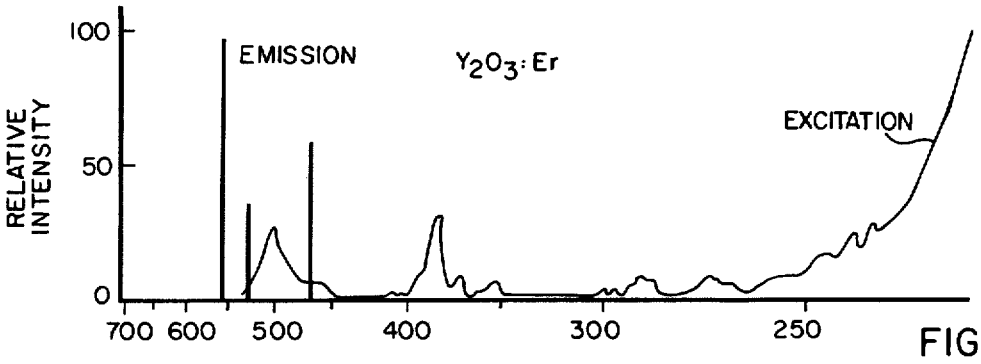
FIG. 12 is a graph similar to FIG. 7, but taken for a trivalent erbium-activated phosphor.
Figure 13:
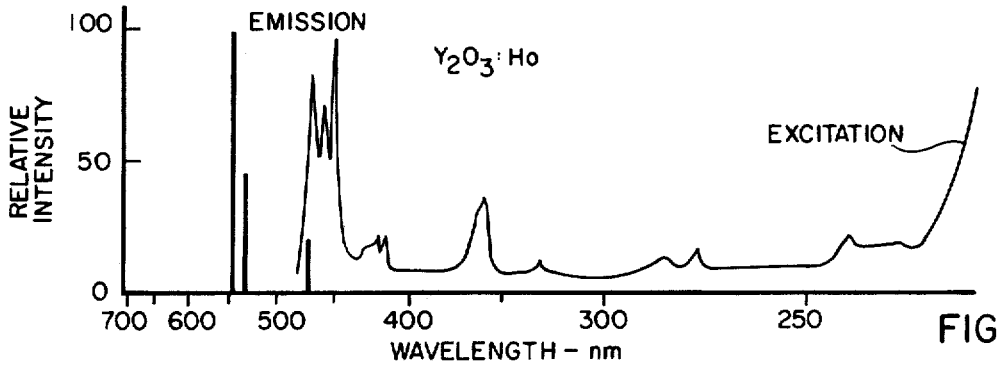
FIG. 13 is a graph similar to FIG. 7, but taken for a trivalent holmium-activated embodiment.
Figure 14:
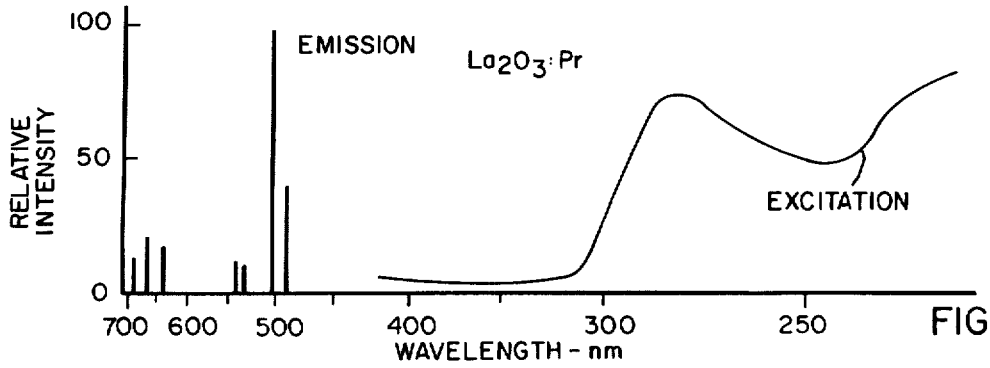
FIG. 14 is a graph similar to FIG. 7, but taken for a lanthanum oxide host activated by trivalent praesodymium.
Figure 15:
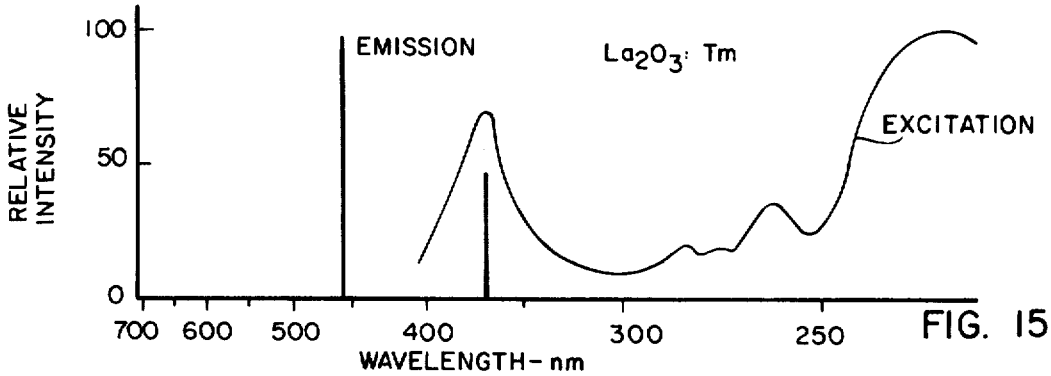
FIG. 15 is a graph similar to FIG. 7, but taken for a lanthanum oxide host activated by trivalent thulium.

As a specific example, in the following Table II different known commercial phosphors are utilized to provide an indicia of the manufacturer of explosives wherein a different spotter phosphor is used for each of eight different explosive manufacturers. These phosphors all have differing band-type emissions and for purposes of illustration, the emission spectrum for a cool white halophosphate is shown in FIG. 4, the emission spectrum for calcium tungstate is shown in FIG. 5, and the emisson spectrum for zinc silicate is shown in FIG. 6.

TABLE II.

| INDICIA OF MANUFACTURER PROVIDED BY SPOTTER PHOSPHOR | |
|---|---|
| Manufacturer: | Spotter phosphor |
| 1 | Bluish white halophosphate. |
| 2 | Cool white halo. |
| 3 | Warm white halo. |
| 4 | Calcium tungstate. |
| 5 | Zinc silicate-manganese. |
| 6 | Calcium silicate-manganese. |
| 7 | Cadmium borate-manganese. |
| 8 | Strontium magnesium phosphate-tin |

A band-type emitting phosphor can also be used, if desired, to provide supplemental information such as an indicia of permissible or non-permissible explosives, as designated by the Bureau of Mines. As an example, magnesium tungstate phosphor could be included in small amount to provide an indicia of permissible explosive and manganese-activated calcium gallate could be utilized to provide an indicia of non-permissible explosive. The number of phosphors which could be substituted for the foregoing specific examples are numerous and for further examples, reference is made to Leverenz, Luminescence of Solids, published by Wiley and Sons, New York (1950) see Table V following page 72 of this reference. As a general rule, phosphors which will oxidize readily desirably should be avoided.

There are numerous different types of dynamites and the foregoing Blaster's Handbook indicates that there are eighteen different commercial types. In addition to the many different types of dynamite, there are also many other types of explosives, such as ammonium nitrate, TNT, etc. In the following Table III, five different phosphors which are activated by different rare-earth metals are utilized to provide a code comprising thirty-one different combinations or "words", namely, a different "word" for each of the eighteen types of dynamites and thirteen remaining "words" which can be used to designate other types of explosives.

To designate a code for the year of manufacture, three phosphors activated by different rare-earth metals are utilized as set forth in the following Table IV. This is set up for a seven year repeating basis.

TABLE IV

| Coding for Year of Manufacture | | | | | | | |
|---|---|---|---|---|---|---|---|
| Year of Mnfg. | 71 | 72 | 73 | 74 | 75 | 76 | 77 |
| Coding | Tb | Dy | Ho | Tb Dy | Tb Ho | Dy Ho | Tb Dy Ho |

To designate different codings for the month of manufacture, four different phosphors activated by different rare-earth metals are listed in the following Table V and in Table VI, other line-emitting activator ions are used to designate the week of manufacture.

TABLE V

| CODING FOR MONTH OF MANUFACTURE | | | | | | | | | | | | |
|---|---|---|---|---|---|---|---|---|---|---|---|---|
| Month of mgf | 1 | 2 | 3 | 4 | 5 | 6 | 7 | 8 | 9 | 10 | 11 | 12 |
| Coding | Sm | Er | Tm | Yb | Sm Er | Sm Tm | Sm Yb | Er Tm | Er Yb | Tm Yb | Sm Er Tm | Sm Tm Yb |

Note.-Sm is 2+-all other are 3+.

TABLE VI

| CODING FOR WEEK OF MANUFACTURE | | | | | |
|---|---|---|---|---|---|
| Week of mnfg | 1 | 2 | 3 | 4 | 5 |
| Coding | $Cr^{+3}$ | $Mn^{+4}$ | $UO_2^{+3}$ | $Cr^{+3}$ $Mn^{+4}$ | $Cr^{+3}$ $UO_2^{+2}$ |

Referring again to Table I, the various different phosphors which all emit distinctive line emissions provide $2^{17}$ or over 131,000 different posibilities. If 10 different spotters are utilized, and this number can be greatly increased if desired, the number of possible combinations substantially exceeds one million. For the purposes of coding explosives, this is thought to be adequate although the number could be greatly expanded by utilizing different identification techniques if desired, as will be explained hereinafter.

As a specific example, if manufacturer number 4, as set forth in Table II, were to manufacture a certain type of dynamite, he would incorporate therein the phosphor conglomerates which were formed of calcium tungstate as a spotter phosphor, magnesium tungstate as an indicia or permissible explosive, praseodymium-activated ytrrium oxide which could be used as a code for straight dynamite (See Table III), terbium-activated yttrium oxide which would indicate 1971 as the year of manufacture (see Table IV), erbium-activated yttrium oxide which would indicate February as the month of manufacture (see Table V) and chromium activated $Al_2O_3$ which would indicate the first week of manufacture (see Table VI). As an example, the finely divided

TABLE III.

| CODING FOR TYPE OF EXPLOSIVE | | | | | | | | | | | | | | | | | | |
|---|---|---|---|---|---|---|---|---|---|---|---|---|---|---|---|---|---|---|
| Type of dynamite | 1 | 2 | 3 | 4 | 5 | 6 | 7 | 8 | 9 | 10 | 11 | 12 | 13 | 14 | 15 | 16 | 17 | 18 |
| Coding | Pr | Nd | Sm | Eu | Gd | Pr Nd | Pr Sm | Pr Eu | Pr Gd | Nd Sm | Nd Eu | Nd Gd | Sm Eu | Sm Gd | Eu Gd | Pr Nd Sm | Pr Nd Eu | Pr Nd Gd |
| Type of other explosive e.g. $NH_4NO_3$ TNT, etc. | | | | | | 19 | 20 | 21 | 22 | 23 | 24 | 25 | 26 | 27 | 28 | 29 | 30 | 31 |
| Coding | | | | | | Pr Sm Eu | Pr Sm Gd | Pr Eu Gd | Nd Sm Eu | Nd Sm Gd | Nd Eu Gd | Sm Eu Gd | Pr Nd Sm Eu | Pr Nd Sm Gd | Pr Nd Eu Gd | Pr Sm Eu Gd | Nd Sm Eu Gd | Pr Nd Sm Eu Gd |

Note. All of the foregoing activator metals are trivalent.

phosphor materials would be mixed in the proportion of 80 percent by weight calcium tungstate, 10 percent by weight magnesium tungstate, and 2 percent by weight of each of the five remaining coding constituents. Since each conglomerate of phosphor contains well in excess of a million individual phosphor particles, each conglomerate is assured of having a representative sampling of each of the spotting and coding constituents which are utilized. After the blast under investigation has occurred, the investigators would wait until dark and them systematically irradiate the area of the blast with 254 nm ultraviolet radiations to which the spotter phorpher responds with a bright blue fluorescence. Once an individual conglomerate or large residual fragment thereof is located, it is a simple matter to pick it up with a tweezer, and analyze same under a monochromator to detect the manufacturer and the characteristic line emissions, which would then be correlated back to the manufacturers records. Since the manufacturer keeps the statistics on the distribution of the dynamite, this will provide an indicia of the source, type and distribution of the explosive.

For purposes of illustration, the principal emission lines and the excitation spectra for various rare-earth metal activated phosphors are illustrated in FIGS. 8 through 15. The emission lines as shown are only the primary lines and in most cases, the line emissions of these rare-earth metals are much more complex.

In the foregoing examples, it is possible to accommodate two or more rare-earth metals as activator materials into the same host or matrix and as many as four can be readily accommodated. In view of the large number of particles which are present in each conglomerate, however, it is probably just as simple to utilize one rare-earth metal or other line-emitting activating ion in each host.

In analyzing the located conglomerates for emisson spectrum, the phosphor can be irradiated with energy which will excite the host, which energy is then transferred to the activators which provide characteristic emission. As a second method, each rare-earth ion can be excited directly by using a tunable excitation source whose output wavelength is scanned over the wavelengths containing the sharp absorption lines of the various activators. The resulting fluorescence is monitored to determine the variation of fluorescent energy with excitation wavelength. As an example, if the host is yttrium oxide activated with europium and terbium, excitation peaks at 395.5 nm for europium and 309 nm for terbium are easily seen by monitoring the fluorescent output in the wavelength range of from 500–700 nm, which contains many of the fluorescent lines of the europium and terbium ions. As an alernative method for observing the spectrum of the located phosphor conglomerate, the presence or absence of europium is determined by exciting the conglomerate with a wavelength of 395.5 nm and observing the presence or absence of the europium fluorescent line at 611.2 nm. Correspondingly, the presence or absence of terbium is noted if an excitation at 309 nm produces, or fails to produce, a fluorescent emission line at 543 nm. The detection of the presence or absence of a very minute quantity of phosphor is extremely accurate using the foregoing techniques.

The conglomerates need not use line-emitting fluorescent phosphors as "coding" indicia, but could readily use other forms of identifying indicia, provided such material could be located after a blast. Relatively simple techniques for identification are those of emission spectroscopy or X-ray fluorescence. The technique of atomic absorption spectroscopy is also well known and can be used to detect very minute quantities of various elements and this is described in the book by Robinson entitled "Atomic Absorption Spectroscopy" published by Dekker, New York (1966). In the foregoing Table VII are listed some elements which are suitable for detection utilizing this atomic absorption spectroscopy technique. These elements should be mixed in a stable form, such as the oxides, phosphates or silicates, for example, as very finely divided material comprising a part of the conglomerate 26 as shown in FIG. 2.

TABLE VII

| | |
|---|---|
| Li | Ni |
| K | Cu |
| Rb | Ag |
| Cs | Au |
| Sr | Zn |
| Cr | Cd |
| Mn | Sb |
| Co | Te |
| | Bi |

Many other techniques are available for identifying particular materials once they have been located such as the procedure described in the book entitled "Neutron Irradiation and Activation Analysis" by Taylor published by Newnes, London, (1964). Elements which can readily be detected utilizing such neutron irradiation and activation analysis technique are set forth in the following Table VII. As noted hereinbelow, these elements should be present as stable compounds.

TABLE VIII

| | | |
|---|---|---|
| Eu | Cu | Yb |
| Dy | Ga | Cd |
| Ho | Au | Co |
| In | La | Mn |
| Ir | Pd | Sb |
| Lu | Sm | Sc |
| Re | Pr | Ta |
| As | Gd | W |
| Tb | Zn | P |
| Er | | |
| K | | |
| Y | | |

The listed elements need only be present in extremely minute quantity in order to be detected and these techniques could be used to supplement the foregoing emission spectra analysis technique which has been described in detail. Combining all the possibilities which result from these added techniques, there is indeed a vast number of possible combinations of coding which could be used.

As noted hereinbefore, while a single inorganic phosphor placed into an explosive in very finely divided form will provide one indicia of information, it is preferred to incorporate many different phosphors into small phosphor conglomerates so that a large number of bits of information will be contained in each conglomerate. In addition, the very size of the conglomerate also facilitates their being readily segregated from the debris of the explosion. The inorganic binder material which is used should be transmissive of at least that energy which excites the spotter phosphor and it should be transmissive of the radiation which the spotter phosphor produces when excited. In the usual case, the phosphor will be responsive to either short wavelength or long wavelength ultraviolet radiations, although other forms of phosphor excitation could be used if desired.

The foregoing specific example has considered potassium silicate as a phosphor binder which meets the foregoing requirements. Many other inorganic binders could be utilized such as sodium silicates which range in composition from $Na_2O \cdot 2SiO_2$ to $Na_2O \cdot 4SiO_2$. These silicates air dry to hard films which do not readily dissolve and if they are heated, the binders will freeze into a solid foam type material. With respect to the potassium silicates, the compositions range from $K_2O \cdot 3.9SiO_2$ to $K_2O \cdot 3.3SiO_2$. Glass-forming inorganic materials can also be used as binders and these include the well known soda-lime-silica glasses of which there are numerous different compositions. Glass-ceramic compositions, which are well known, can also be used as binders. Other refractory materials could be used as a binder fabricated about the phosphor particle with a sintering type of process. As a general rule, it has been found that the finer the phosphor particles, the stronger the particle conglomerate with respect to resisting the blast effects of the detonation. With most phosphor materials, it is a relatively simple matter to obtain ultimate particles which have a diameter in the order of two microns and less.

When the explosive material is detonated, there may be some fracturing of the individual conglomerate, but the continuity of the conglomerates is sufficiently maintained that each conglomerate will contain all coding information which is initially placed therein. The conglomerates can even be intermixed with RDX and, after detonation, the continuity of the conglomerates will still be preserved to a degree sufficient to insure that all coding information is present. This is about as extreme a test as the conglomerates can be subjected to, because of the extremely high velocity of detonation and high detonation pressures of this explosive material.

Figure 16:
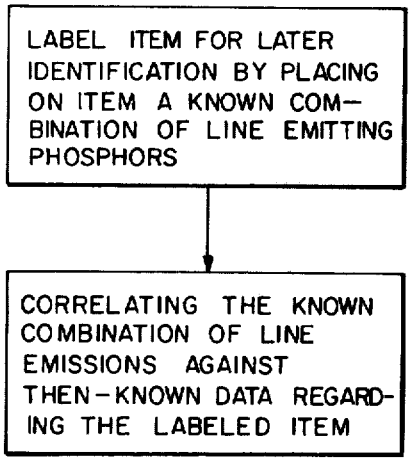
FIG. 16 is a flow chart illustrating the basic steps utilized in labeling an item for later identification through the use of line-emitting phosphors.
Figure 18:
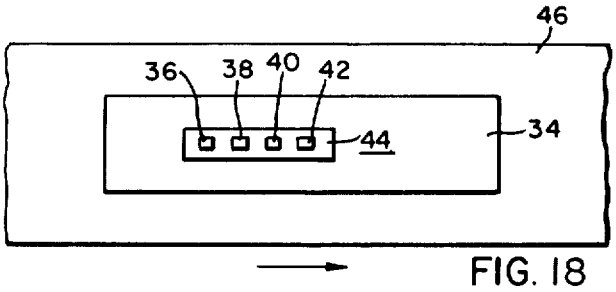
FIG. 18 is a plan view of the item shown in FIG. 17, taken along the lines XVIII—XVIII in the direction of the arrows.
Figure 17:
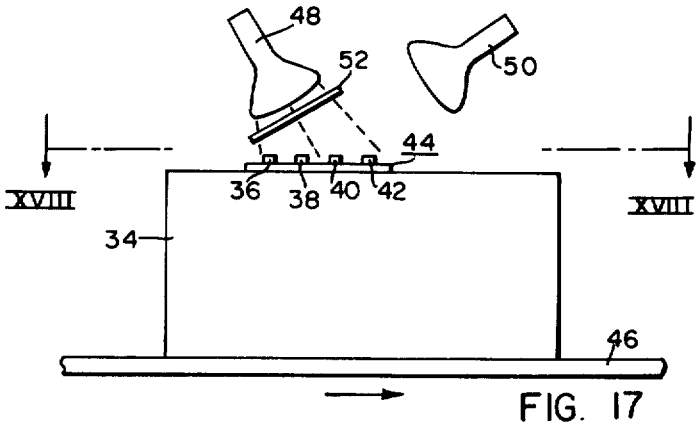
FIG. 17 is a schematic view of an apparatus which could be utilized for scanning a previously labeled item in order to derive the information which had previously been placed thereon.

The line-emitting phosphors can be applied as separate patches to label any item with an individualistic and readily identifiable indicia to provide an item identification at a location which is remote from that location at which the label was applied. No specific orientation of the label is required. In practicing such a method, as is generally shown in the flow chart of FIG. 16, there is first assembled a combination of different phosphor materials at least the substantial portion of which are inorganic phosphors activated by different ions which taken together provide a vast number of different known combination of distinctive line emissions when the phosphors are excited by predetermined energy other than visible light. The known phosphor combination is then secured in intimate association, as a label for example, with the item to be identified. Thereafter, when it is desired to identify the item, the known combination of line emissions is correlated against the previously recorded combination of emissions so that the item is readily identified. Turning to the number of ions which will provide line emitting phosphors as disclosed in Table I, the number of different combinations disclosed in this table alone exceed 131,000. In FIGS. 17 and 18 are shown an example of a coded item 34 wherein each of the four patches 36, 38, 40 and 42 comprise a different rare-earth metal activated phosphor to comprise a coded label 44. The labeled item 34 is passed on a conveyor belt 46 beneath an ultraviolet lamp 48 and the fluorescence of the label 44 is scanned by a pick-up photocell 50 or similar conventional read-out device.

The foregoing number of possible combinations can be extended substantially by using each line-emitting activator ion in two or more different hosts which have what the phosphor art terms larger band gap energies, with each host being capable of transferring energy to the line-emitter activator ion. In decoding the information, the phosphors would be excited sequentially with two or more wavelengths of light of progressively shorter wavelength. The first exciting longer wavelength would be capable of exciting only that host which had the lowest band gap energy, the next shorter wavelength would be capable of exciting the second host, and so forth. As a specific example, yttrium oxide ($Y_2O_3$) has a band gap energy of 5.8 ev; the host $Y_2O_2S$ has a band gap energy less than 5.8 ev; the host $Y_2OS_2$ has a band gas energy substantially less than 5.8 ev and greater than 2.5 ev; and the host $Y_2S_3$ has a band gap energy of about 2.5 ev. All of these hosts would be activated by a trivalent europium, for example, and they would be sequentially excited first with long wavelength energy and then with progressively shorter wavelength energy with the resulting fluorecence observed. For example, the label would be pumped sequentially with wavelengths of 3 ev, 4 ev, 5 ev and 6 ev. In this manner, the total number of possible combinations could be extended substantially.

As a second possibility of decoding the combination of line-emitters, a plurality of hosts which have progressively larger band gap energies would be utilized as in the previous example and these would be excited sequentially with successively higher energies (i.e., shorter wavelength excitations). Between the excitation source 48 and the fluorescent label 44 would be placed a set of filters, each of which is capable of passing one and only one of the exciting energies. For purposes of illustration, one filter 52 is shown in FIG. 17. This would greatly extend the number of total combinations. The use of more than one filter 52 will normally require a separate ultraviolet lamp 48. This technique could also be used to eliminate spurious emissions as might occur from a fluorescent dye actually incorporated as a part of an item to be detected. The fluorecent dye would in all probability respond to all energies and by deliberately omitting from the label a phosphor which will respond to a predetermined excitation energy, the possibility of spurious signals could be eliminated since if the labeled item did respond to a predetermined excitation, the presence of the fluorescent dye would be indicated. As an example, if an excitation energy of 300 nm were used to excite a fluorescent dye such as sodium fluorescein, and no phosphor were present which would respond to such excitation, the presence of the fluorescent dye would be indicated, and the item would have to be specially handled.

Figure 19:
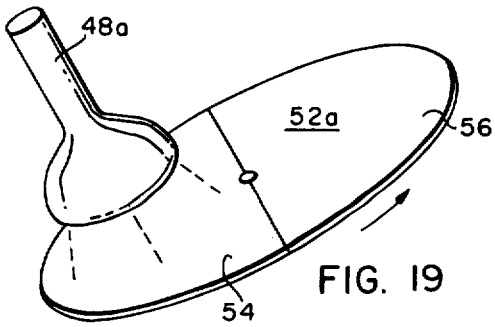
FIG. 19 is an isometric view of an alternative excitation source and modified filter, as could be used with the scanning apparatus as shown in FIGS. 17 and 18.

In FIG. 19 is shown a modified form of excitation source 48a, which for this embodiment is a reflector-type high-pressure mercury vapor lamp, modified to incorporate an ultraviolet transmitting faceplate. This lamp emits strong radiations at 254 nm and 365 nm. Between the lamp 48a and the object to be irradiated, such as the label 44 as shown in FIG. 17, is placed a rotating filter 52a, one half portion 54 of which is a filter which passes only 254 nm radiations and the other half portion 56 of which passes only 365 nm radiations. In this manner, the label 44 can be sequentially excited with successively varying energies as the filter 52a is rotated. The signal from the photocell 50 is read only when the items which comprise the label 44 are irradiated only with the 254 nm excitation or the 365 nm excitation.

As an alternative embodiment, the small conglomerates can be coated with a non-fluorescing, ultraviolet-radiation-absorbing organic combustible, such as polymethyl methacrylate. If the explosive cartridge is broken open and exposed to ultraviolet radiations, the coated conglomerates will not fluoresce and their detection and removal will be a most difficult task. When the explosive cartridge is detonated, however, the organic coating will burn in the reactive atmospheres, leaving the residual fluorescent conglomerates. Such a coating may also have benefit in forming a seal about the conglomerates to inhibit absorption of any material of the environment in which the conglomerates are intended to be used.

While the foregoing description has been generally directed to coding of commercial-type explosives, the techniques described herein could also be used to code other types of explosives and propellant materials. The coding techniques as described can also be used to identify explosive agents. As an example, ammonium nitrate could be coded with the phosphor conglomerates. When this explosive agent is further processed into a form suitable for use, the conglomerates would remain in the resulting explosive material.

We claim as our invention:

1. In combination, explosive agent or explosive material and associated means which will provide an indicia of information regarding said explosive agent or explosive material, said combination comprising:

a. an explosive agent or explosive material; and b. a relatively small amount of inorganic phosphor means incorporated with and retained in intimate association with said explosive agent or explosive material and receptive to the shock, pressure, high temperature and reactive atmospheres resulting from the ultimate detonation thereof, and the fluorescence of said phosphor means comprising a readily identifiable indicia of information regarding said explosive agent or explosive material.

2. In combination, solid explosive material and associated individualistic and readily determinable phosphor means which will provide an indicia of information regarding said explosive material either before or after detonation of same, said combination comprising:

a. solid explosive material; and b. a relatively small amount of conglomerated small particles scattered within said explosive, said conglomerated particles comprising a first finely divided phosphor material which is excited by predetermined energy to produce a predetermined emission of readily detectable radiations, at least one finely divided second phosphor material which is excited by predetermined energy to produce a predetermined individualistic emission of radiations which is different from the emission of said first phosphor material, and inorganic binder material intimately holding together said first phosphor material and second phosphor material as a plurality of small particles each comprising said conglomerates of said first finely divided phosphor material and said second finely divided phosphor material, and said binder material transmissive of at least said predetermined energy which excites said first phosphor material and transmissive of said readily detectable radiations produced by said excited first phosphor material.

3. The combination as specified in claim 2, wherein said explosive material comprises dynamite, said first phosphor material is efficiently excited by ultra-violet radiations to provide a band-type emission, said second phosphor material is excited by ultra-violet radiations to produce a line-type emission, and the relative amount of said first phosphor material substantially exceeds the relative amount of said second phosphor material.

4. The combination as specified in claim 3, wherein said conglomerates comprise from about 0.01 to 1 percent by weight of said dynamite, said conglomerates are of such size as to weigh about one milligram each, said first and second phosphor materials comprise about 80 percent by weight of said conglomerates, said first phosphor material is apatite structured halophosphate activated by antimony and manganese, and said second phoshphor material comprises yttrium oxide matrix activated by trivalent europium, and the weight ratio of said first phosphor material to said second phosphor material is about 90:10.

5. The combination as specified in claim 2, wherein said solid explosive material has the general configuration of an explosive cartridge.

6. In combination, an explosive cartridge and associated means which will provide an indicia of information regarding said explosive cartridge, said combination comprising:

a. an explosive cartridge comprising a casing and explosive material enclosed by said casing; and b. a relatively small amount of inorganic fluorescent phosphor means incorporated with and retained in intimate association with said explosive cartridge and receptive to the shock, pressure, high temperature and reactive atmospheres resulting from the ultimate detonation thereof, and the fluorescence of said phosphor means comprising a readily locatable indicia of information regarding said explosive cartridge.

7. In combination, explosive agent or explosive material and associated means which will provide an indicia of information regarding said explosive agent or explosive material, said combination comprising:

a. an explosive agent or explosive material; and b. a relatively small amount of inorganic phosphor means incorporated with and retained in intimate association with said explosive agent or explosive material and receptive to the shock, pressure, high temperature and reactive atmospheres resulting from the ultimate detonation thereof, and the fluorescence of said phosphor means comprising a readily identifiable indicia of information regarding said explosive agent or explosive material, said phosphor means is in finely divided form, and finely divided other material is retained in intimate association with said phosphor means in the form of small conglomerates, said finely divided other material upon identification providing individualistic indicia of information, and once said other material has been located, said other material is readily identifiable.

8. In combination, explosive agent or explosive material and associated means which will provide an indicia of information regarding said explosive agent or explosive material, said combination comprising:

a. an explosive agent or explosive material; and b. a relatively small amount of inorganic phosphor means incorporated with and retained in intimate association with said explosive agent or explosive material and receptive to the shock, pressure, high temperature and reactive atmospheres resulting from the ultimate detonation thereof, and the fluorescence of said phosphor means comprising a readily identifiable indicia of information regarding said explosive agent or explosive material, said phosphor means is in finely divided form, and finely divided other material is retained in intimate association with said phosphor means in the form of small conglomerates, said finely divided other material upon identification providing individualistic indicia of information, and once said other material has been located, said other material is readily identifiable by at least one of the procedures of emission spectroscopy, atomic absorption spectroscopy, X-ray fluorescence analysis, neutron irradiation and activation analysis, or distinctive fluorescent emission response.

9. The combination as specified in claim 8, wherein said conglomerates are scattered throughout said explosive agent or explosive material.

10. In combination, explosive agent or explosive material and associated means which will provide an indicia of information regarding said explosive agent or explosive material, said combination comprising:

a. an explosive agent or explosive material; and b. a relatively small amount of inorganic phosphor means incorporated with and retained in intimate association with said explosive agent or explosive material and receptive to the shock, pressure, high temperature and reactive atmospheres resulting from the ultimate detonation thereof, and the fluorescence of said phosphor means comprising a readily identifiable indicia of information regarding said explosive agent or explosive material, said phosphor means is in finely divided form, and finely divided other material is retained in intimate association with said phosphor means in the form of small conglomerates, said finely divided other material upon identification providing individualistic indicia of information, and once said other material has been located, said other material is readily identifiable by at least one of the procedures of emission spectroscopy, atomic absorption spectroscopy, X-ray fluorescence analysis, neutron irradiation and activation analysis, or distinctive fluorescent emission response, and said distinctive fluorescent emission response comprises line emisson fluorescent response.

11. In combination, an explosive cartridge and associated means which will provide an indicia of information regarding said explosive cartridge, said combination comprising:

a. an explosive cartridge comprising a casing and explosive material, enclosed by said casing; and b. a relatively small amount of inorganic fluorescent phosphor means incorporated with and retained in intimate association with said explosive cartridge and receptive to the shock, pressure, high temperature and reactive atmospheres resulting from the ultimate detonation thereof, and the fluorescence of said phosphor means comprising a readily located indicia of information regarding said explosive cartridge, said phosphor means is in finely divided form, and finely divided other material is retained in intimate association with said phosphor means in the form of small conglomerates, said finely divided other material upon identification providing individualistic indicia of information, and once said other material has been located, said other material is readily identifiable.

12. In combination, an explosive cartridge and associated means which will provide an indicia of information regarding said explosive cartridge, said combination comprising:

a. an explosive cartridge comprising a casing and explosive material enclosed by said casing; and b. a relatively small amount of inorganic fluorescent phosphor means incorporated with and retained in intimate association with said explosive cartridge and receptive to the shock, pressure, high temperature and reactive atmospheres resulting from the ultimate detonation thereof, and the fluorescence of said phosphor means comprising a readily located indicia of information regarding said explosive cartridge, said phosphor means is in finely divided form, and finely divided other material is retained in intimate association with said phorphor means in the form of small conglomerates, said finely divided other material upon identification providing individualistic indicia of information, and once said other material has been located, said other material is readily identifiable by at least one of the procedures of emission spectroscopy, atomic absorption spectroscopy, X-ray fluorescence analysis, neutron irradiation and activation analysis, or distinctive fluorescent emission response.

13. In combination, [en] *an* explosive cartridge and associated means which will provide an indicia of information regarding said explosive cartridge, said combination comprising:

a. an explosive cartridge comprising a casing and explosive material enclosed by said casing; and b. a relatively small amount of inorganic fluorescent phosphor means incorporated with and retained in intimate association with said explosive cartridge and receptive to the shock, pressure, high temperature and reactive atmospheres resulting from the ultimate detonation thereof, and the fluorescence of said phosphor means comprising a readily locatable indicia of information regarding said explosive cartridge, said phosphor means is in finely divided form, and finely divided other material is retained in intimate association with said phosphor means in the form of small conglomerates, said finely divided other material upon identification providing individualistic indicia of information, and once said other material has been located said other material is readily identifiable by at least one of the procedures of emission spectroscopy, atomic absorption spectroscopy, X-ray fluorescence analysis, neutron irradiation and activation analysis, or distinctive fluorescent emission response, and said distinctive fluorescent emission response comprises line emission fluorescent response.

14. In combination, an explosive cartridge and asscociated means which will provide an indicia of information regarding said explosive cartridge, said combination comprising:

a. an explosive cartridge comprising a casing and explosive material enclosed by said casing; and b. a relatively small amount of inorganic fluorescent phosphor means incorporated with and retained in intimate association with said explosive cartridge and receptive to the shock, pressure, high temperature and reactive atmospheres resulting from the ultimate detonation thereof, and the fluorescence of said phosphor means comprising a readily locatable indicia of information regarding said explosive cartridge, said inorganic phosphor means comprises a plurality of conglomerated small particles, said conglomerated small particles comprising a first finely divided phosphor material which is excited by predetermined energy to produce a predetermined emission of readily detectable radiations, at least one finely divided second phosphor material which is excited by predetermined energy to produce a predetermined individualistic emission of radiations which is different from the emission of said first phosphor material, and inorganic binder material intimately holding together said first phosphor material and second phosphor material as a plurality of small particles each comprising said conglomerates of said first finely divided phosphor material and said second finely divided phosphor material, and said binder material transmissive of at least said predetermined energy which excites said first phosphor material and transmissive of said readily detectable radiations produced by said excited first phosphor material.

*15. An explosive device comprising an explosive material and inorganic luminscent material making-up less than about 1 percent by weight of the explosive device such that prior to detonation of the explosive device the luminescent material is not readily detectable under ambient light while following detonation of the explosive device the luminescent material is detectable upon excitation by a nonvisible excitation radiation.*

*16. An explosive device of claim 15 in which the luminescent material is present in an amount of from about 0.01 to about 1 percent.*

*17. An explosive device of claim 15 in which the luminescent material is added to explosive material in the explosive device.*

*18. An explosive device of claim 15 in which the luminescent material is a fluorescent material.*

*19. An explosive device of claim 15 in which the luminescent material is a phosphorescent material.*

*20. An explosive device of claim 15 in which at least two luminescent materials are employed.*

*21. An explosive device as claimed in claim 15 in which the average particle size of the luminescent material is about 500 to 700 microns.*

* * * * *